United States Patent
Park (10) Patent No.: US 12,202,516 B2
(45) Date of Patent: Jan. 21, 2025

(54) STEERING CONTROL METHOD FOR AUTONOMOUS VEHICLES

(71) Applicants: Hyundai Motor Company, Seoul (KR); Kia Corporation, Seoul (KR)

(72) Inventor: Young Uk Park, Gunpo-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 190 days.

(21) Appl. No.: 17/982,193

(22) Filed: Nov. 7, 2022

(65) Prior Publication Data

US 2023/0373525 A1 Nov. 23, 2023

(30) Foreign Application Priority Data

May 17, 2022 (KR) ........................ 10-2022-0060176

(51) Int. Cl.
*B60W 40/08* (2012.01)
*B60W 40/105* (2012.01)
*B60W 60/00* (2020.01)

(52) U.S. Cl.
CPC ........ *B60W 60/0013* (2020.02); *B60W 40/08* (2013.01); *B60W 40/105* (2013.01); *B60W 2520/125* (2013.01); *B60W 2520/14* (2013.01); *B60W 2540/18* (2013.01); *B60W 2540/227* (2020.02)

(58) Field of Classification Search
CPC ............ B60W 60/0013; B60W 40/08; B60W 40/105; B60W 2520/125; B60W 2520/14; B60W 2540/18; B60W 2540/227; B60W 2520/10; B60W 2552/30; B60W 2720/125; B60W 10/20; B60W 40/109; B60W 30/18145; B60W 2040/0881; B60W 2540/049; B60W 40/072; B60W 40/107; B60W 40/114; B62D 15/025; B62D 6/002; B62D 7/159
See application file for complete search history.

(56) References Cited

U.S. PATENT DOCUMENTS

2018/0086374 A1* 3/2018 Sato ........................ B62D 6/10

FOREIGN PATENT DOCUMENTS

| JP | S60259571 A | * | 12/1985 |
| JP | 2006143011 A | * | 6/2006 |
| JP | 2007076399 A | * | 3/2007 |

(Continued)

*Primary Examiner* — Justin Holmes
(74) *Attorney, Agent, or Firm* — Morgan, Lewis & Bockius LLP (57) ABSTRACT

A steering control method for autonomous vehicles includes detecting a location of an occupant sitting in an autonomous vehicle, determining, by a controller, a control target location of the vehicle while turning, based on the detected location of the occupant, determining, by the controller, a lateral acceleration of the vehicle at the control target location, determining, by the controller, whether intervening in steering of the vehicle by a rear wheel steering (RWS) device is required, in consideration of a target value of lateral acceleration in response to a driving state of the vehicle and the determined value of lateral acceleration, and performing, when the controller concludes that the intervening in the steering by the RWS device is required, by the controller, the intervening in the steering by controlling the RWS device.

18 Claims, 4 Drawing Sheets

(56) References Cited

FOREIGN PATENT DOCUMENTS

| JP | 2010285036 A | * | 12/2010 | | |
|---|---|---|---|---|---|
| KR | 10-2015-0036536 | | 4/2015 | | |
| WO | WO-2010100719 A1 | * | 9/2010 | ............. | B62D 6/002 |
| WO | WO-2020261724 A1 | * | 12/2020 | ............ | B60W 40/08 |

* cited by examiner

STEERING CONTROL METHOD FOR AUTONOMOUS VEHICLES

CROSS REFERENCE TO RELATED APPLICATION

The present application claims priority to Korean Patent Application No. 10-2022-0060176, filed May 17, 2022, the entire contents of which is incorporated herein for all purposes by this reference.

BACKGROUND OF THE PRESENT DISCLOSURE

Field of the Present Disclosure

The present disclosure relates to a steering control method for autonomous vehicles.

Description of Related Art

An autonomous vehicle is controlled to determine a driving path by itself according to the current location and destination, and to follow the determined driving path.

Conventionally, when the vehicle is steered to follow the driving path, a steering wheel is steered regardless of a location of an occupant sitting in the vehicle. Therefore, the occupant in the vehicle feels different lateral acceleration even under the same steering condition in response to a sitting location.

Figure 1:
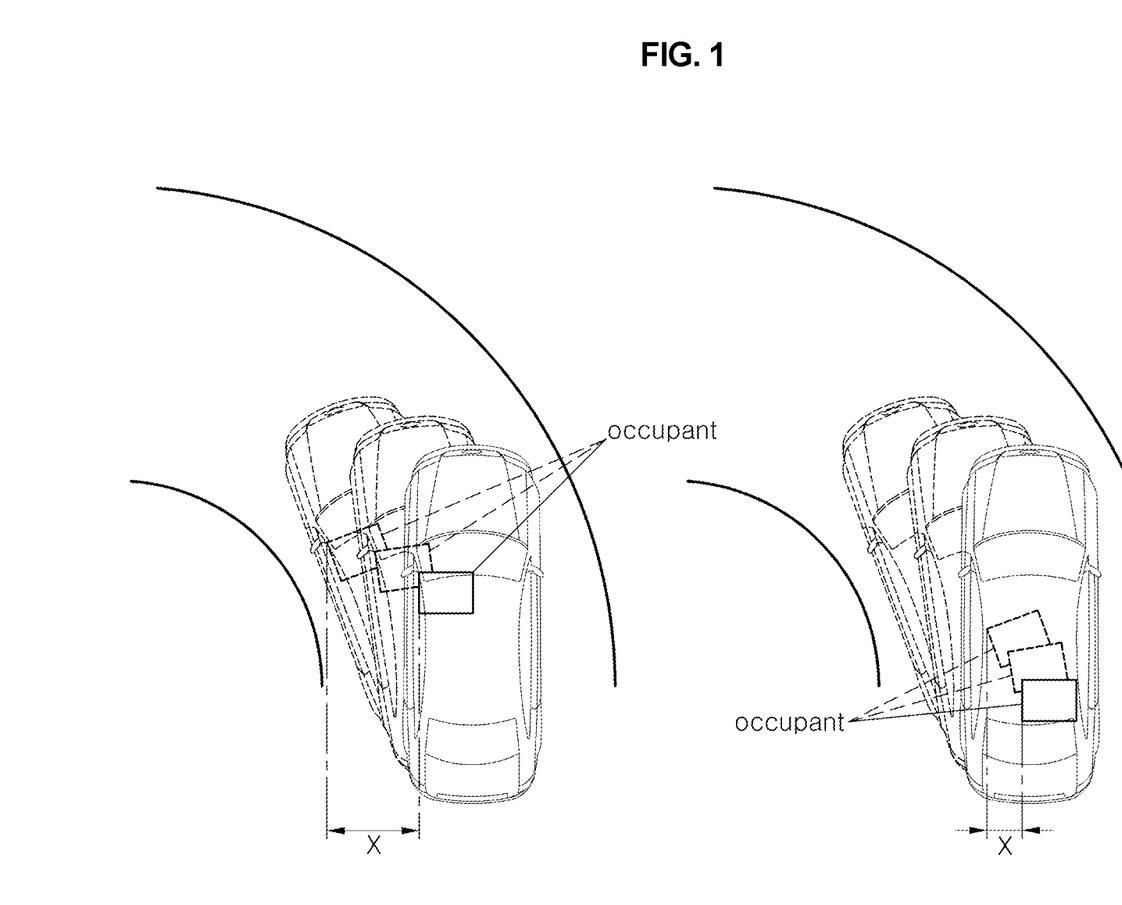
FIG. 1 is a view showing difference comparison of lateral acceleration in response to sitting locations of an occupant.

In other words, as shown in comparison of FIG. 1, when the vehicle is controlled to perform turning driving under the same condition of the same driving path in a case where the occupant sits in a first row left seat in a front portion of the vehicle and a case where the occupant sits in a second row right seat in a rear portion of the vehicle, a difference in the lateral movement amount X of the occupant occurs as shown in FIG. 1, so that the occupant can feel different lateral accelerations in different locations.

However, the difference in lateral acceleration as described above significantly affects the riding comfort felt by the occupant.

Meanwhile, a rear wheel steering (RWS) device is configured to steering rear wheels of a vehicle, and may improve a driving property of the vehicle by steering the rear wheels in phase or out of phase with front wheels.

For reference, a device provided to steering the front wheels separately from the RWS device is a front wheel steering (FWS) device, and since the vehicle with the RWS device substantially steers the front and rear wheels together, and the vehicle may be referred to as an all wheel steering (AWS) vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a steering control method for autonomous vehicles, wherein the steering control method is configured to improve the ride comfort felt by an occupant by performing steering control in a direction in which lateral acceleration at an occupant sitting location is reduced, in consideration of the occupant sitting location, in an autonomous path following control of an AWS vehicle with a FWS device and a RWS device.

In an aspect of the present disclosure, there is provided a steering control method for autonomous vehicles, the steering control method including: detecting a location of an occupant sitting in an autonomous vehicle; determining, by a controller, a control target location of the vehicle while turning, based on the detected location of the occupant; determining, by the controller, a lateral acceleration of the vehicle at the control target location; determining, by the controller, whether intervening in steering of the vehicle by a rear wheel steering (RWS) device is required, in consideration of a target value of the lateral acceleration in response to a driving state of the vehicle and the determined value of the lateral acceleration; and performing, when the controller concludes that the intervening in the steering by the RWS device is required, by the controller, the intervening in the steering by controlling the RWS device.

The control target location of the vehicle may be determined in accordance with whether the number of seats on which occupants are occupied is greater in either a front portion or a rear portion in the vehicle.

When the number of seats on which the occupants are occupied is greater in the front portion in the vehicle than the rear portion, the front portion in the vehicle may be determined as the control target location; when the number of seats on which the occupants are occupied is greater in the rear portion of the vehicle than the front portion, the rear portion in the vehicle may be determined as the control target location; and when the number of seats on which the occupants are occupied is equivalent in the front portion and the rear portion of the vehicle, a center portion of the vehicle may be determined as the control target location.

The target value of the lateral acceleration depending on the driving state of the vehicle may include a map including at least one of the control target location, a vehicle speed, and a path curvature as an independent variable.

The lateral acceleration at the control target location may be determined using a yaw rate and a speed of the vehicle.

When a difference between the target value and the determined value of the lateral acceleration exceeds a predetermined reference value, it may be determined that the intervening in the steering by the RWS device is required.

When the difference between the target value and the determined value of the lateral acceleration is less than or equal to the predetermined reference value, steering control may be performed only with a front wheel steering (FWS) device while excluding the intervening in the steering by the RWS device.

When a difference between the target value and the determined value of the lateral acceleration exceeds a reference value of the lateral acceleration, and a vehicle speed exceeds a predetermined reference vehicle speed, and a lateral path error is less than a predetermined reference error, it may be determined that the intervening in the steering by the RWS device is required.

When the difference between the target value and the determined value of the lateral acceleration is less than or equal to the predetermined reference value, and the vehicle speed is less than or equal to the predetermined reference vehicle speed, and the lateral path error is equal to or greater than the predetermined reference error, steering control may be performed only with a front wheel steering (FWS) device while excluding the intervening in the steering by the RWS device.

When it is determined that the intervening in the steering by the RWS device is required, the controller may control a front wheel steering (FWS) device and the RWS device by determining an front wheel steering angle and a rear wheel steering angle to reduce a difference between the target value and the determined value of the lateral acceleration at the control target location.

When it is determined that the intervening in the steering by the RWS device is required, the controller may control the RWS device by determining a rear wheel steering angle to reduce a difference between the target value and the determined value of the lateral acceleration at the control target location.

According to an exemplary embodiment of the present disclosure, the steering control method for autonomous vehicles is configured to perform steering control in a direction in which lateral acceleration at an occupant sitting location is reduced, in consideration of the occupant sitting location, in autonomous path following control of an AWS vehicle with a FWS device and a RWS device. Therefore, it is possible to improve the ride comfort felt by an occupant.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the present specification. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" may be interpreted in the same manner as those described above.

The terminology used herein is for describing various exemplary embodiments only and is not intended to limit the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

Hereinbelow, a various exemplary embodiments of the present disclosure will be described in detail with reference to accompanying drawings. The same reference numerals will be used throughout the drawings to refer to the same elements or parts.

Figure 2:
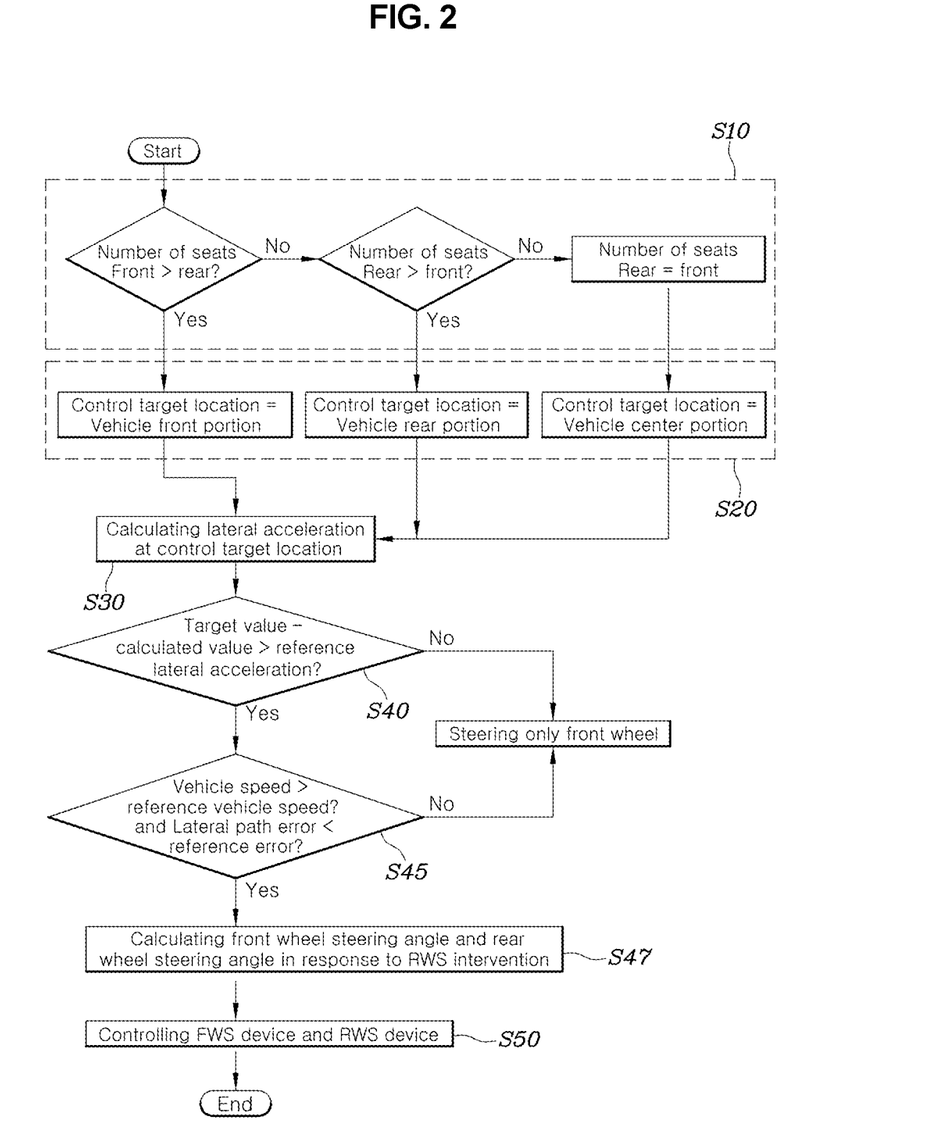
FIG. 2 is a view showing according a steering control method for autonomous vehicles according to various exemplary embodiments of the present disclosure.

Referring to FIG. 2, the steering control method for autonomous vehicles according to various exemplary embodiments of the present disclosure includes: detecting a sitting location of an occupant in an autonomous vehicle at S10; determining, by the controller, based on the detected location of the occupant, the control target location of the vehicle while turning driving at S20; determining, by the controller, a lateral acceleration at the control target location at S30; in consideration of a target value of the lateral acceleration and a determined value of the lateral acceleration depending on vehicle driving state, and determining whether steering intervention of a RWS device is necessary at S40; and when it is determined that the steering intervention of the RWS device is necessary, performing, by controller, the steering intervention by controlling a RWS device at S50.

In other words, according to an exemplary embodiment of the present disclosure, during autonomous turning driving of a vehicle, in consideration of a location of an occupant in the vehicle, steering using rear wheel steering (RWS) is operated to enable the occupant feels lateral acceleration as little as possible. Accordingly, the ride comfort of the vehicle is improved, ultimately improving the merchantability of the vehicle.

A sitting location of the occupant in the vehicle may be identified using a signal of a seating sensor provided in a seat.

A control target location of the vehicle may be determined depending on whether the number of seats on which occupants are occupied is greater in either a front portion or a rear portion of the vehicle.

In other words, when the number of seats on which the occupants are occupied is greater in the front portion of the vehicle than the rear portion thereof, the front portion of the vehicle is determined as the control target location; when the number of the seats on which the occupants are occupied is greater in the rear portion of the vehicle than the front portion thereof, the rear portion of the vehicle is determined as the control target location; and when the number of the seats on which the occupants are occupied is the same in the front and rear portions of the vehicle, a center portion of the vehicle is determined as the control target location.

In the above cases, the control target location is determined any of three portions of the front, rear, and center portions of the vehicle.

Otherwise, the control target location of the vehicle may be subdivided in response to actual seat locations in the vehicle.

Accordingly, in the instant case, the control target location may be divided, for example, a front left portion, a front right portion, a rear left portion, a rear right portion, a center left portion, and a center right portion, etc.

However, in the instant case, depending on various divisions of the control target location, a map of a target value of lateral acceleration, which will be described later, is enlarged, and a determined value of lateral acceleration may be determined in response to a divided location.

The target value of lateral acceleration depending on a driving state of the vehicle may include the map including at least one of the control target location, a vehicle speed, and a path curvature as an independent variable.

Figure 3:
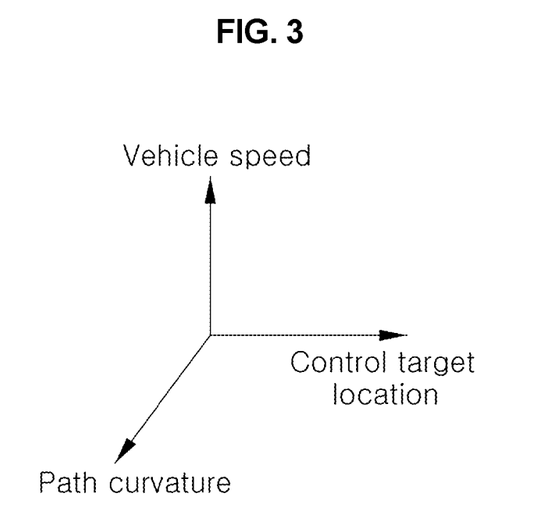
FIG. 3 is a view showing a controller implementing the steering control method for autonomous vehicles according to an exemplary embodiment of the present disclosure.

For example, as shown in FIG. 3, the map of the target value of lateral acceleration may be presented as a map with the form in which a point in space in a three-dimensional coordinate system with the control target location, the vehicle speed, and the path curvature the vehicle drives as each coordinate axis indicates the target value of lateral acceleration about the corresponding control target location, vehicle speed, and path curvature.

Herein, the target value of lateral acceleration may be determined as the minimum value of lateral acceleration which may be implemented with the vehicle in consideration of the control target location, the vehicle speed, and the path curvature by a number of experiments and interpretations.

The lateral acceleration at the control target location may be determined using a yaw rate and a speed of the vehicle.

When a difference between the target value and the determined value of lateral acceleration exceeds a predetermined reference value of lateral acceleration, it is determined that the steering intervention of the RWS device is necessary.

Herein, the reference value of lateral acceleration is determined by being planned by a number of experiments and analysis, and may be determined in consideration of a value of lateral acceleration at a level at which it is possible to reduce the lateral acceleration at the control target location by steering intervention of the RWS device.

When the difference between the target value and the determined value of the lateral acceleration is less than or equal to the reference value of the lateral acceleration, steering control is performed only with a FWS device while excluding the steering intervention of the RWS device Furthermore, when the difference between the target value and the determined value of lateral acceleration exceeds the reference value of the lateral acceleration, and a vehicle speed exceeds a predetermined reference vehicle speed, and a lateral path error is less than a predetermined reference error, it may be determined that the steering intervention of the RWS device is necessary (referring to S45).

Herein, the reference speed may be determined by a number of experiments and analysis, in consideration of a speed at a level at which lateral acceleration negatively affecting the ride comfort of the vehicle in a current driving path may be generated.

Furthermore, the lateral path error indicates the degree to which the vehicle cannot follow a target path for the vehicle to travel, and when a lateral path error above a predetermined level occurs, the steering intervention of the RWS device as described above may not have an effect of reducing the actual lateral acceleration, and rather, the possibility of increasing the lateral acceleration cannot be excluded. In the instant case, the lateral path error should be preset at a level at which the steering intervention of the RWS device is not performed.

Therefore, the lateral path error may be preset according to the above purpose, by a number of experiments and analysis.

Meanwhile, when the difference between the target value and the determined value of the lateral acceleration is less than or equal to the reference value of the lateral acceleration, and the vehicle speed is less than or equal to the predetermined reference vehicle speed, and the lateral path error is equal to or greater than the predetermined reference error, the steering control is performed only with the FWS device while excluding the steering intervention of the RWS device.

In other words, when the determined value of the lateral acceleration is close to the target value, or the vehicle speed is low so that there is no fear of lateral acceleration at a level at which discomfort occurs, or the lateral path error is large so that the purpose of the control of the present disclosure cannot be saved, the steering intervention of the RWS device is not performed, but the steering control is performed only with the FWS device as the conventional case.

When it is determined that the steering intervention of the RWS device is necessary, the controller is configured to control the FWS device and the RWS device by determining an front wheel steering angle and a rear wheel steering angle for reducing the difference between the target value and the determined value of the lateral acceleration at the control target location.

Alternatively, when it is determined that the steering intervention of the RWS device is necessary, the controller is configured to determine a rear wheel steering angle to reduce the difference between the target value and the determined value of the lateral acceleration at the control target location to control the RWS device, so that front wheels continue to perform existing control of steering angle (referring to S47).

As described above, the control of the present disclosure is repeatedly performed while autonomous turning driving continues without intervention of the driver.

Figure 4:
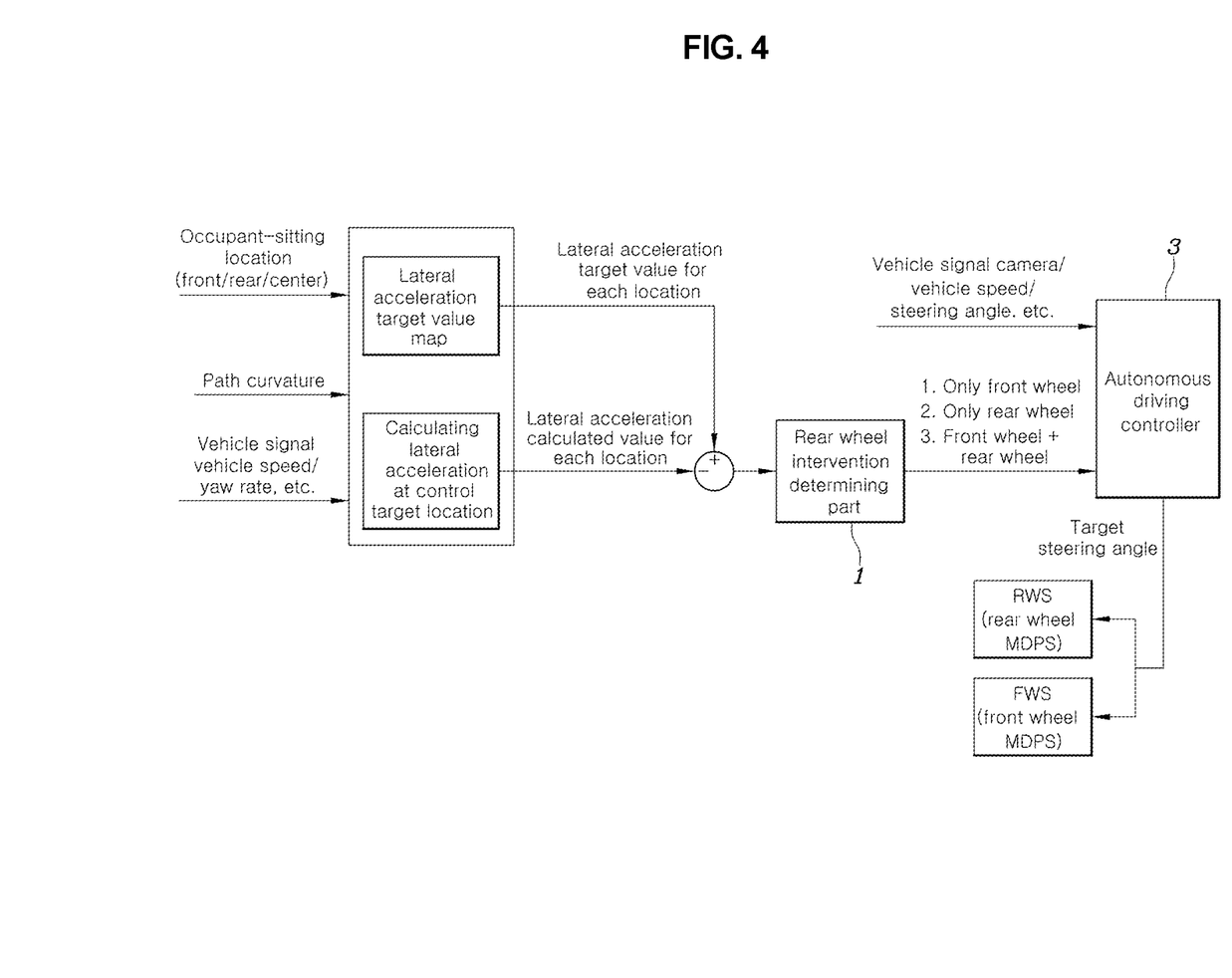
FIG. 4 is a block diagram showing the steering control method for autonomous vehicles according to an exemplary embodiment of the present disclosure.

FIG. 4 is a block diagram showing an apparatus of the present disclosure as described above, and by receiving detecting information related to a sitting location of the occupant, a curvature of the vehicle to travel, vehicle speed, yaw rate, etc., the present disclosure determines a target value of lateral acceleration depending on a control target location, vehicle speed, and path curvature, etc. is determined in response to a current sitting location of the occupant from the lateral acceleration target value map.

Furthermore, by determining a difference in the determined value of lateral acceleration at the control target location, the determined value being determined based on vehicle speed and yaw rate, a rear wheel intervention determining portion 1 determines target steering angles of the front wheels and the rear wheels to determine whether steering is performed only with the front wheels as in the existing state, or the rear wheels are additionally used to intervene in the steering control while the front wheels continue to perform the existing steering control, and thus determining whether the front wheels and the rear wheels are controlled together.

The autonomous driving controller 3 determines the front wheel steering angle and the rear wheel steering angle in response to determination of the rear wheel intervention determining portion 1 to control the FWS device and the RWS device, minimizing the lateral acceleration at an occupant sitting location and improving the riding comfort of the vehicle.

For reference, the front wheels and the rear wheels include motor driving power steering (MDPS), and may be configured to automatically perform steering operation by the autonomous driving controller as described above.

In an exemplary embodiment of the present invention, the rear wheel intervention determining portion 1 may be integrated into the autonomous driving controller 3.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data non-transitory storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data non-transitory storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A steering control method for a vehicle, the steering control method comprising:
   detecting a location of an occupant sitting in the vehicle;
   determining, by a controller, a control target location of the vehicle while turning, based on the detected location of the occupant;
   determining, by the controller, a value of a lateral acceleration of the vehicle at the control target location;
   determining, by the controller, whether intervening in steering of the vehicle by a rear wheel steering (RWS) device is required, in consideration of a target value of the lateral acceleration in response to a driving state of the vehicle and the determined value of the lateral acceleration; and
   performing, when the controller concludes that the intervening in the steering by the RWS device is required, by the controller, the intervening in the steering by controlling the RWS device,
   wherein the control target location of the vehicle is determined depending on whether a number of seats on which occupants are occupied is greater in either a front portion or a rear portion in the vehicle.

2. The steering control method of claim 1,
   wherein when the number of seats on which the occupants are occupied is greater in the front portion in the vehicle than the rear portion, the front portion in the vehicle is determined as the control target location,
   wherein when the number of seats on which the occupants are occupied is greater in the rear portion of the vehicle than the front portion, the rear portion in the vehicle is determined as the control target location, and
   wherein when the number of seats on which the occupants are occupied is equivalent in the front portion and the rear portion of the vehicle, a center portion of the vehicle is determined as the control target location.

3. The steering control method of claim 1, wherein the target value of the lateral acceleration in accordance with the driving state of the vehicle includes a map including at least one of the control target location, a vehicle speed, and a path curvature as an independent variable.

4. The steering control method of claim 1, wherein the lateral acceleration at the control target location is determined using a yaw rate and a speed of the vehicle.

5. The steering control method of claim 1, wherein when a difference between the target value and the determined value of the lateral acceleration exceeds a predetermined reference value, the controller is configured to conclude that the intervening in the steering by the RWS device is required.

6. The steering control method of claim 5, wherein when the difference between the target value and the determined value of the lateral acceleration is less than or equal to the predetermined reference value, the steering is performed only with a front wheel steering (FWS) device while excluding the intervening in the steering by the RWS device.

7. The steering control method of claim 5, wherein when the difference between the target value and the determined value of the lateral acceleration exceeds the predetermined reference value, and a vehicle speed exceeds a predetermined reference vehicle speed, and a lateral path error is less than a predetermined reference error, the controller is configured to conclude that the intervening in the steering by the RWS device is required.

8. The steering control method of claim 7, wherein when the difference between the target value and the determined value of the lateral acceleration is less than or equal to the predetermined reference value, and the vehicle speed is less than or equal to the predetermined reference vehicle speed, and the lateral path error is equal to or greater than the predetermined reference error, the steering is performed only with a front wheel steering (FWS) device while excluding the intervening in the steering by the RWS device.

9. The steering control method of claim 1, wherein when the controller concludes that the intervening in the steering by the RWS device is required, the controller is configured to control a front wheel steering (FWS) device and the RWS device by determining an front wheel steering angle and a rear wheel steering angle to reduce a difference between the target value and the determined value of the lateral acceleration at the control target location.

10. The steering control method of claim 1, wherein when the controller concludes that the intervening in the steering by the RWS device is required, the controller is configured to control the RWS device by determining a rear wheel steering angle to reduce a difference between the target value and the determined value of the lateral acceleration at the control target location.

11. An apparatus of steering a vehicle, the apparatus comprising:
    a seating sensor configured for detecting a sitting location of an occupant in the vehicle;
    a rear wheel steering (RWS) device;
    a front wheel steering (FWS) device; and
    a controller electrically connected to the seating sensor, the RWS device and the FWS device,
    wherein the controller is configured for:
       determining a control target location of the vehicle while turning, based on the detected sitting location of the occupant;
       determining a value of a lateral acceleration of the vehicle at the control target location;
       determining whether intervening in steering of the vehicle by the RWS device is required, in consideration of a target value of the lateral acceleration in response to a driving state of the vehicle and the determined value of the lateral acceleration; and
       performing, when the controller concludes that the intervening in the steering by the RWS device is required, the intervening in the steering by controlling the RWS device,
       wherein the control target location of the vehicle is determined depending on whether a number of seats on which occupants are occupied is greater in either a front portion or a rear portion in the vehicle.

12. The apparatus of claim 11,
    wherein when the number of seats on which the occupants are occupied is greater in the front portion in the vehicle than the rear portion, the front portion in the vehicle is determined as the control target location,
    wherein when the number of seats on which the occupants are occupied is greater in the rear portion of the vehicle than the front portion, the rear portion in the vehicle is determined as the control target location, and
    wherein when the number of seats on which the occupants are occupied is equivalent in the front portion and the rear portion of the vehicle, a center portion of the vehicle is determined as the control target location.

13. The apparatus of claim 11, wherein the target value of the lateral acceleration in accordance with the driving state of the vehicle includes a map including at least one of the control target location, a vehicle speed, and a path curvature as an independent variable.

14. The apparatus of claim 11, wherein when a difference between the target value and the determined value of the lateral acceleration exceeds a predetermined reference value, the controller is configured to conclude that the intervening in the steering by the RWS device is required.

15. The apparatus of claim 14, wherein when the difference between the target value and the determined value of the lateral acceleration is less than or equal to the predetermined reference value, the steering is performed only with the front wheel steering (FWS) device while excluding the intervening in the steering by the RWS device.

16. The apparatus of claim 14,
wherein when the difference between the target value and the determined value of the lateral acceleration exceeds the predetermined reference value, and a vehicle speed exceeds a predetermined reference vehicle speed, and a lateral path error is less than a predetermined reference error, the controller is configured to conclude that the intervening in the steering by the RWS device is required, and
wherein when the difference between the target value and the determined value of the lateral acceleration is less than or equal to the predetermined reference value, and the vehicle speed is less than or equal to the predetermined reference vehicle speed, and the lateral path error is equal to or greater than the predetermined reference error, the steering is performed only with the front wheel steering (FWS) device while excluding the intervening in the steering by the RWS device.

17. The apparatus of claim 11, wherein when the controller concludes that the intervening in the steering by the RWS device is required, the controller is configured to control the FWS device and the RWS device by determining an front wheel steering angle and a rear wheel steering angle to reduce a difference between the target value and the determined value of the lateral acceleration at the control target location.

18. The apparatus of claim 11, wherein when the controller concludes that the intervening in the steering by the RWS device is required, the controller is configured to control the RWS device by determining a rear wheel steering angle to reduce a difference between the target value and the determined value of the lateral acceleration at the control target location.

* * * * *